US 11,086,926 B2

(12) United States Patent
Garg et al.

(10) Patent No.: US 11,086,926 B2
(45) Date of Patent: *Aug. 10, 2021

(54) THUMBNAIL GENERATION FROM PANORAMIC IMAGES

(71) Applicant: Adobe Inc., San Jose, CA (US)

(72) Inventors: Tulika Garg, Ghaziabad (IN); Neeraj Goel, Ghaziabad (IN)

(73) Assignee: Adobe Inc., San Jose, CA (US)

(*) Notice: Subject to any disclaimer, the term of this patent is extended or adjusted under 35 U.S.C. 154(b) by 44 days.

This patent is subject to a terminal disclaimer.

(21) Appl. No.: 16/526,710

(22) Filed: Jul. 30, 2019

(65) Prior Publication Data
US 2019/0354550 A1 Nov. 21, 2019

Related U.S. Application Data

(63) Continuation of application No. 15/594,992, filed on May 15, 2017, now Pat. No. 10,417,276.

(51) Int. Cl.
*G06F 16/583* (2019.01)
*H04N 1/387* (2006.01)
(Continued)

(52) U.S. Cl.
CPC ........ *G06F 16/5838* (2019.01); *G06F 3/0482* (2013.01); *G06F 16/54* (2019.01);
(Continued)

(58) Field of Classification Search
CPC ............. H04N 5/23238; H04N 5/2628; H04N 1/3876; H04N 5/2621; H04N 1/3935
See application file for complete search history.

(56) References Cited

U.S. PATENT DOCUMENTS

| 8,447,136 B2* | 5/2013 | Ofek ...................... G09B 29/00 |
| | | 382/284 |
| 9,247,133 B2* | 1/2016 | Doepke ................ H04N 5/2624 |

(Continued)

FOREIGN PATENT DOCUMENTS

| CN | 107633241 | 1/2018 |
| WO | WO-2017215899 | 12/2017 |

OTHER PUBLICATIONS

"Combined Search and Examination Report", GB Application No. 1800168.5, dated Jul. 5, 2018, 7 pages.
(Continued)

*Primary Examiner* — Bobbak Safaipour
(74) *Attorney, Agent, or Firm* — FIG. 1 Patents (57) ABSTRACT

Generating thumbnails from panoramic images is described. In one or more implementations, a 2D projection of a panoramic image is received and projected onto a 3D surface to generate a 3D projection. Portions of the 3D projection are formed, and each portion is projected to a 2D plane to generate 2D projections of the portions. Object recognition is then performed on the portions that identifies objects, attributes of the objects, and locations of the objects within the panoramic image. Responsive to an image search query matching one of the recognized objects, the system generates a thumbnail from the panoramic image specific to a portion of the panoramic image that contains the object and outputs the thumbnail.

20 Claims, 11 Drawing Sheets

(51) Int. Cl.
| | | |
|---|---|---|
| H04N 5/262 | (2006.01) | |
| H04N 1/393 | (2006.01) | |
| H04N 5/232 | (2006.01) | |
| G06F 3/0482 | (2013.01) | |
| G06F 16/54 | (2019.01) | |
| G06T 3/00 | (2006.01) | |
| G06T 3/40 | (2006.01) | |
| G06T 11/60 | (2006.01) | |

(52) U.S. Cl.
CPC ........ *G06F 16/583* (2019.01); *G06F 16/5846* (2019.01); *G06T 3/0012* (2013.01); *G06T 3/0062* (2013.01); *G06T 3/4038* (2013.01); *H04N 1/3876* (2013.01); *H04N 1/3935* (2013.01); *H04N 5/23238* (2013.01); *H04N 5/2621* (2013.01); *H04N 5/2628* (2013.01); *G06T 11/60* (2013.01)

(56) References Cited

U.S. PATENT DOCUMENTS

| | | | |
|---|---|---|---|
| 9,582,731 B1* | 2/2017 | Butko | G06K 9/00664 |
| 9,998,664 B1 | 6/2018 | Long et al. | |
| 10,027,888 B1* | 7/2018 | Mackraz | H04N 13/383 |
| 10,127,632 B1* | 11/2018 | Burke | G06T 3/4038 |
| 10,148,876 B1* | 12/2018 | Ribeiro | H04N 21/2187 |
| 10,417,276 B2* | 9/2019 | Garg | G06T 3/4038 |
| 2008/0037829 A1* | 2/2008 | Givon | G06T 7/251 |
| | | | 382/107 |
| 2008/0291217 A1* | 11/2008 | Vincent | G06T 19/00 |
| | | | 345/629 |
| 2010/0119121 A1* | 5/2010 | Lim | G01C 21/3679 |
| | | | 382/113 |
| 2010/0212910 A1* | 8/2010 | James | F15B 11/13 |
| | | | 166/373 |
| 2012/0076426 A1* | 3/2012 | Kim | G06F 16/58 |
| | | | 382/209 |
| 2013/0207973 A1* | 8/2013 | Mattila | A63F 13/52 |
| | | | 345/420 |
| 2013/0229434 A1* | 9/2013 | Ofek | G06T 5/50 |
| | | | 345/634 |
| 2013/0321461 A1* | 12/2013 | Filip | G06F 16/954 |
| | | | 345/632 |
| 2013/0326419 A1* | 12/2013 | Harada | H04N 5/23238 |
| | | | 715/838 |
| 2014/0169699 A1* | 6/2014 | Li | G06T 3/00 |
| | | | 382/285 |
| 2014/0300596 A1* | 10/2014 | Liu | G06T 5/006 |
| | | | 345/419 |
| 2014/0300693 A1* | 10/2014 | Hirata | G03B 37/02 |
| | | | 348/39 |
| 2014/0368426 A1* | 12/2014 | Umehara | G06F 3/04815 |
| | | | 345/156 |
| 2015/0139524 A1* | 5/2015 | Choi | G06T 7/13 |
| | | | 382/132 |
| 2015/0358613 A1* | 12/2015 | Sandrew | G06T 15/205 |
| | | | 348/36 |
| 2015/0379086 A1* | 12/2015 | Sheridan | G06K 9/3233 |
| | | | 707/748 |
| 2017/0039457 A1* | 2/2017 | Yu | G06N 3/02 |
| 2017/0212910 A1* | 7/2017 | Morris | G06T 7/70 |
| 2017/0223268 A1* | 8/2017 | Shimmoto | H04N 5/23238 |
| 2018/0114348 A1* | 4/2018 | Lu | G06T 7/60 |
| 2018/0143756 A1* | 5/2018 | Mildrew | G06T 19/003 |
| 2018/0181568 A1* | 6/2018 | Leong | G06F 16/5866 |
| 2018/0184001 A1* | 6/2018 | Yoshida | H04N 1/00 |
| 2018/0270417 A1* | 9/2018 | Suitoh | H04N 5/3572 |
| 2018/0329927 A1 | 11/2018 | Garg et al. | |
| 2018/0357245 A1* | 12/2018 | Garg | G06T 13/80 |
| 2018/0367777 A1* | 12/2018 | Li | G01S 3/00 |

OTHER PUBLICATIONS

"First Action Interview Office Action", U.S. Appl. No. 15/594,992, dated Apr. 11, 2019, 3 pages.

"Lecture 109—Sliding Windows", Retrieved at: https://www.coursera.org/learn/machine-learning/lecture/bQhq3/sliding-windows—on Jan. 11, 2017, 2 pages.

"Notice of Allowance", U.S. Appl. No. 15/594,992, dated May 3, 2019, 8 pages.

"Pre-Interview First Office Action", U.S. Appl. No. 15/594,992, dated Feb. 7, 2019, 3 pages.

Sedegah,"Smart Tags Use Machine Learning to Bring Your Images Back to Life", https://blogs.adobe.com/digitalmarketing/digital-marketing/smart-tags-use-machine-learning-bring-images-back-life/, Mar. 21, 2016, 4 pages.

* cited by examiner

$(\lambda_1, \varphi_2)$ 802 $(\lambda_2, \varphi_2)$

⇒

Bench $(\lambda_1, \varphi_1)$ $(\lambda_2, \varphi_1)$

$(\lambda_3, \varphi_4)$ 804 $(\lambda_4, \varphi_4)$

⇒

Boat $(\lambda_3, \varphi_3)$ $(\lambda_4, \varphi_3)$ $(\lambda_5, \varphi_6)$ 806 $(\lambda_6, \varphi_6)$

⇒

Life Ring Box $(\lambda_5, \varphi_5)$ $(\lambda_6, \varphi_5)$

902
Generate a three-dimensional projection of a panoramic image.

904
Form a plurality of portions from the three-dimensional projection of the panoramic image.

906
Generate a plurality of two-dimensional projections for the plurality of portions by projecting a respective said portion onto a two-dimensional plane.

908
Determine locations of objects and information about the objects by performing object recognition on the plurality of two-dimensional projections.

910
Output the locations of the objects and the information about the objects.

THUMBNAIL GENERATION FROM PANORAMIC IMAGES

RELATED APPLICATIONS

This Application claims priority as a continuation of U.S. patent application Ser. No. 15/594,992, filed May 15, 2017, and titled "Thumbnail Generation from Panoramic Images," the subject matter of which is hereby incorporated by reference in its entirety.

BACKGROUND

The volume of digital images, hereinafter also referred to as "images" for simplicity in the following discussion, that are available for consumption by users is ever increasing. As the volume of images increases, so too does the need for accurate and user friendly searching of the images. In order to find images with specific content, users often provide search terms or other criteria to a computing device to obtain meaningful results. For example, the computing device may perform an image search using the search term "boat," and a group of images that have been identified as containing a boat may be returned. In typical digital images, a simple display of the returned images works well, e.g. via thumbnails, as the thumbnail typically captures an entirety of content included in the image, e.g., a particular object. However, basic thumbnail generation from panoramic images can be problematic due to the amount of content included even within a single image.

Panoramic images are typically viewed as 3D projections due to fields of view that are generally larger than that of a human eye. Because 3D projections generally require specialized viewers, such as Marzipano®, panoramic images are most often stored and viewed as two-dimensional (2D) projections, e.g. equirectangular projections and fish eye projections. Therefore, in order to return panoramic images in response to an image search, a conventional computing device typically generates a thumbnail of an entire 2D projection of the panoramic image. However, this may cause distortion to objects within the projection and result in an inability to discern individual objects within the projection. In another conventional technique, a computing device may create a thumbnail of a center portion of the 2D projection (where it is undistorted) to represent a panoramic image. Although the thumbnail of the centered portion is visually pleasing and comprehendible to a user, many of the objects within the image may reside outside of the thumbnail. Accordingly, if an image search involves an object that is outside of the thumbnail portion, the user will most likely determine that the image is irrelevant to the search even though the panoramic image contains the object. Thus, conventional techniques fail to generate useful thumbnails of panoramic images such that a user can easily see specific content within the panoramic images responsive to an image search.

SUMMARY

Thumbnail generation by a computing device from panoramic images is described. The thumbnails are based on portions of panoramic images that are specific to recognized objects within the panoramic images. In this way, a user can quickly and easily see a thumbnail of a portion of a panoramic image that is relevant to an image search. By utilizing relevant thumbnails, the technical limitations of conventional image search techniques when confronted with panoramic images can be overcome. In an implementation, a digital medium environment includes at least one computing device that is configured to receive a 2D projection of a panoramic image. The computing device projects the 2D projection onto a 3D surface, such as a sphere. From there, the computing device generates a series of 2D projections of portions of the 3D projection and runs object recognition on the 2D portions. The computing device then identifies object and location of the objects within the panoramic image. The computing device is then configured to generate a 2D projection of a portion of the panoramic image that includes an object that is a subject of an image search.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Panoramic images generally capture a scene with a field of view that is larger than that of a human eye. The most intuitive way to view a panoramic image through use of a computing device is by projecting the panoramic image onto a 3D surface, for example, onto a sphere "around" the viewer. Although a 3D projection may be the best way to visualize a panoramic image via a computing device, it is not a practical format for storing and viewing panoramic images, thus, panoramic images are most often stored as 2D projections. Similar techniques have long been used by map makers to project portions of globes, to generate 2D maps, as traveling with a globe is not practical. Although 2D projections display an entirety of the image data contained within the panoramic image, 2D projections of entire panoramic images are typically hard to decipher and often contain a large amount of distortion. Conventional techniques used to present panoramic images to users either rely on generation of a thumbnail of the entirety of the 2D projection or generation of a thumbnail of the center portion of the 2D projection. Thus, these conventional techniques may result in generation of a thumbnail that is difficult to decipher and may lack portions of the panoramic image that are relevant to a user, e.g., as part of an image search.

Techniques and systems are described to generate thumbnails from panoramic images. When searching for digital images, a user's experience is generally dictated by the accuracy of the results and the speed at which images can be parsed to find images of interest. In the special case of a panoramic image, a user wants to view portions of the panoramic images that are relevant to an image search, such that the user can quickly and easily determine if the image is relevant.

In one example, the computing device receives a panoramic image, from which, the thumbnail is to be generated. The panoramic image may be configured in a variety of ways, such as a 2D projection, a 3D projection, a virtual reality format, a specialized file format for panoramic images, and so on. Regardless, of how the panoramic image is received, the computing device projects the panoramic image onto a 3D surface to generate a 3D projection (if it is not already). From the 3D projection, the computing device generates a series of portions of the 3D projection and projects these portions to 2D planes. For example, the computing device may use a "sliding window" over the 3D surface in order to generate this series. The computing device then performs object recognition on the portions to identify objects and attributes of the objects within the portions along with locations of the objects relative to the 3D projection. Responsive to one of the objects matching a user search query, the computing device may then generate a thumbnail by projecting the coordinates of the identified object from the 3D projection to a 2D plane for output. In this way, a user search for an image of an object can receive a thumbnail of a portion of a panoramic image specific to that object. A variety of other examples are also contemplated as further described in the following sections.

An example environment is described that may employ the thumbnail generation techniques described herein. Example procedures are then described which may be performed in the example environment as well as other environments. Consequently, performance of the example procedures is not limited to the example environment and the example environment is not limited to performance of the example procedures.

Terms

The term "panoramic image" refers to any electronic image file that captures image data showing a field of view greater than a human eye, approximately 160° by 75°. For example, many panoramic images have fields of view of 360° by 180°, which are referred to as 360° panorama or panoramic images, spherical view images, globe view images, and so on.

The term "thumbnail" refers to a representation of an image that is easily sent, stored, and consumed. Examples of thumbnails are portions of digital images or lower resolution representations of digital images.

The term "2D projection" or "forward projection" refers to any sort projection of a panoramic image or a portion of a panoramic image onto a 2D plane such as a cylindrical projection, equirectangular projection, fisheye projection, cubic projection, and so on. 2D projections are typically used to store and display panoramic images.

The term "3D projection" or "reverse projection" refers to any sort of projection of a panoramic image or a portion of a panoramic image onto a 3D surface such as a sphere. Although these types of projections are more intuitive for a user, 3D projections necessitate complicated interfaces to view properly.

The term "object" refers to a recognized or identified portion of a panoramic image that has attributes. An example of an object is a white sail boat.

The term "location" refers to a location of an object within the panoramic image such that a 2D projection of a portion of the panoramic image corresponding to the object can be created. An example location may be a bounding box having four longitude and latitude coordinates.

Example Environment

Figure 1:
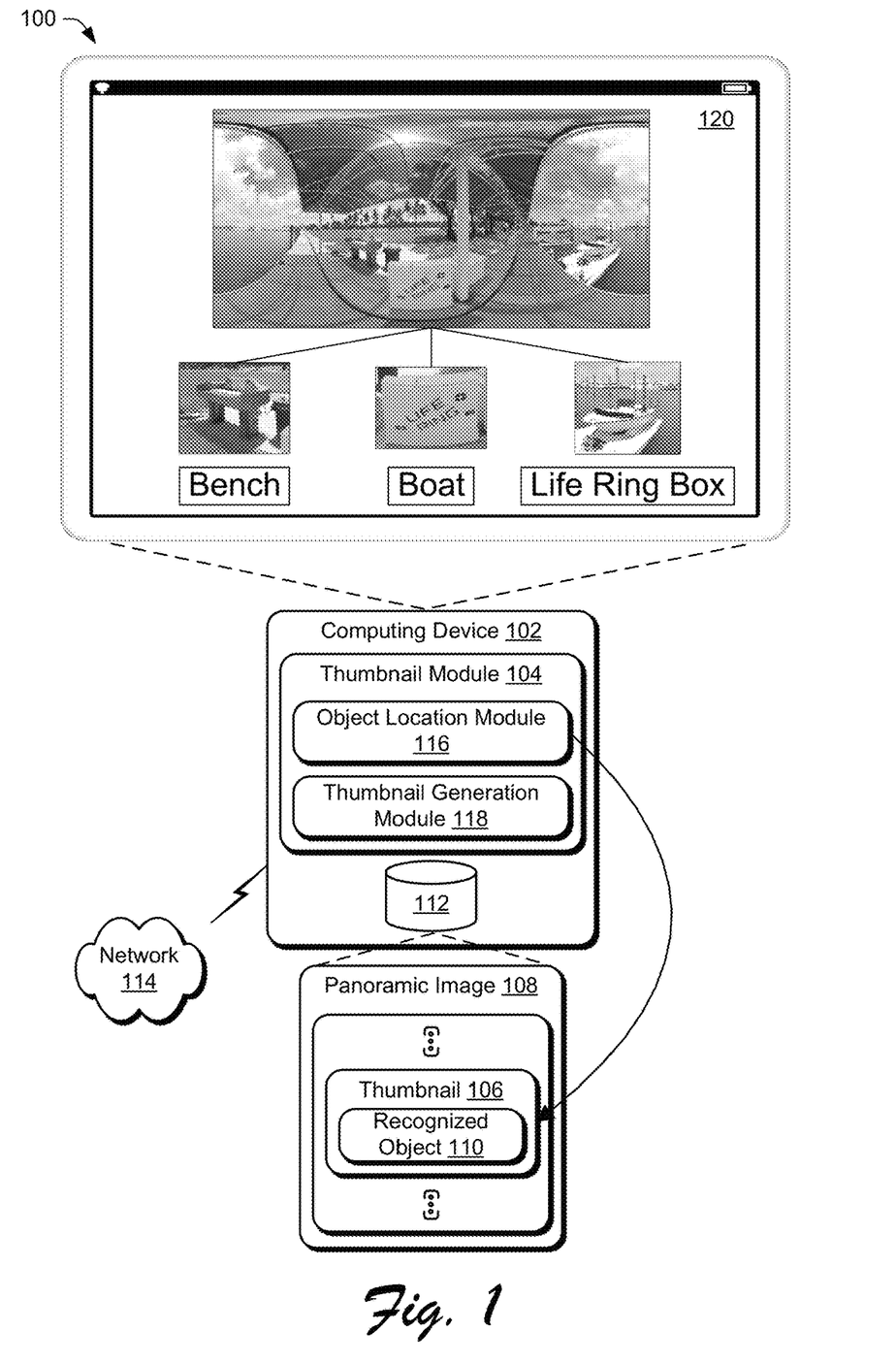
FIG. 1 is an illustration of a digital medium environment in an example implementation that is operable to generate thumbnails from panoramic images.

FIG. 1 depicts a digital medium environment, generally at 100, in an example implementation that is operable to generate thumbnails from panoramic images. The illustrated digital medium environment 100 includes a computing device 102 that contains a thumbnail module 104. The thumbnail module 104 is implemented at least partially in hardware of the computing device 102 to generate a thumbnail 106 from a panoramic image 108. The thumbnail 106, for instance, may be configured to capture a recognized object 110 contained within panoramic image 108. Both the panoramic image 108 and thumbnail 106 are illustrated as stored in a storage device 112. In one implementation, thumbnail module 104, portions of thumbnail module 104, panoramic image 108, thumbnail 106, or any combination thereof may be implemented in whole or in part "in the cloud" via network 114, e.g., the Internet, a Wi-Fi network (e.g., in accordance with one or more IEEE 802.11 standards), a wireless network, cellular data network, and so forth.

In order to generate the thumbnail 106, the thumbnail module 104 utilizes a object location module 116 that is implemented at least partially in hardware to receive panoramic image 108 and generate thumbnail 106 corresponding to recognized object 110 within the panoramic image 108. Although shown as a single thumbnail with a single recognized object, multiple thumbnails may be generated for a single panoramic image. For example, a user interface view 120 may be displayed that displays three thumbnails associated with three recognized objects (a bench, a boat, and a life ring box) from panoramic image 108. Details of the object location module 116 and how it is implemented to generate thumbnail 106 of panoramic image 108 is described with regards to FIG. 2.

The thumbnail module 104 also contains a thumbnail generation module 118 that is implemented at least partially in hardware to return thumbnail 106 from panoramic image 108 responsive to recognized object 110 matching a search query. In this way, thumbnail 106 of recognized object 110 within panoramic image 108 may be returned responsive to the computing device 102 receiving an image search query corresponding to recognized object 110. Details of the thumbnail generation module 118 and how it is implemented to return thumbnail 106 of panoramic image 108 is described with regards to FIG. 3.

Figure 2:
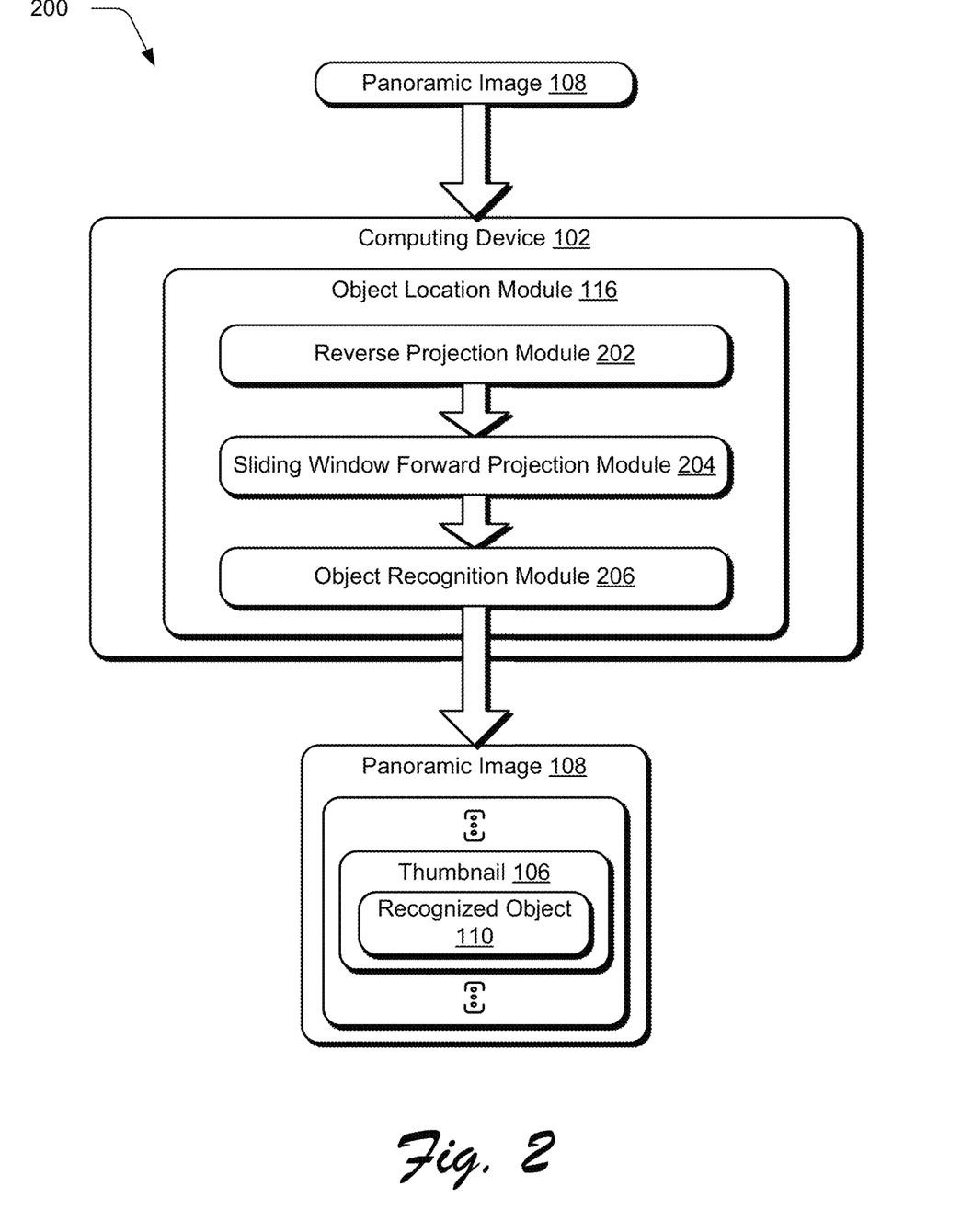
FIG. 2 is an illustration of an example digital medium implementation illustrating the object location module of FIG. 1 in greater detail.

FIG. 2 depicts an example implementation, generally at 200, showing operation of the object location module 116 of FIG. 1 in greater detail as generating a thumbnail 106 of panoramic image 108 associated with recognized object 110 within panoramic image 108. In order to do so, the computing device 102 first receives the panoramic image 108. The panoramic image 108 may be received as raw data, a 3D projection, a 2D projection, a panoramic viewer file type, and so on. The panoramic image 108 may be received locally from computing device 102, e.g. from storage 112, or from another computing device connected to computing device 102 through network 114, e.g., the Internet, a Wi-Fi network (e.g., in accordance with one or more IEEE 802.11 standards), a wireless network, cellular data network, via upload or email, and so forth. The computing device 102 utilizes a reverse projection module 202 that is implemented at least partially in hardware to project the received panoramic image 108 onto a 3D surface, such as a sphere, in order to generate a 3D projection of the panoramic image 108. For example, when the panoramic image 108 is projected onto a sphere, it can be imagined as a viewer of the image being at the center of the sphere with the scene projected in all sides around them. If panoramic image 108 is received as a suitable 3D projection, then there is no need to project it.

The 3D projection of the panoramic image is then received by a sliding window forward projection module 204 that is implemented at least partially in hardware to generate 2D projections of portions of the 3D projection. The sliding window forward projection module 204 utilizes a window that is "slid" over the surface of the 3D projection, and the 2D projections are generated for each new portion that the window encompasses. Various sizes of the window/portion may be utilized by the sliding window forward projection module 204 to create the 2D projections of the portions.

The 2D projections of the portions of the panoramic image are then received by an object recognition module 206 that is implemented at least partially in hardware to recognize objects within the 2D projections of the portions. The object recognition may examine each portion individually or on combinations of the portions. Thus, objects may be detected that are contained within a single portion or span multiple portions. The object recognition module 206 recognizes the objects and determines locations of the objects within the panoramic image. For example, a location of an object may comprise a bounding box with pixel coordinates that surrounds the object. Coordinates are discussed further with respect to FIGS. 4 and 6-8. The object recognition module 206 then generates thumbnails 106 for respective recognized objects 110 in the panoramic image 108 based on the locations of the recognized objects. The thumbnails may be stored as actual thumbnails or as locations of the objects such that relevant thumbnails may be generated at a time of an image search.

Figure 3:
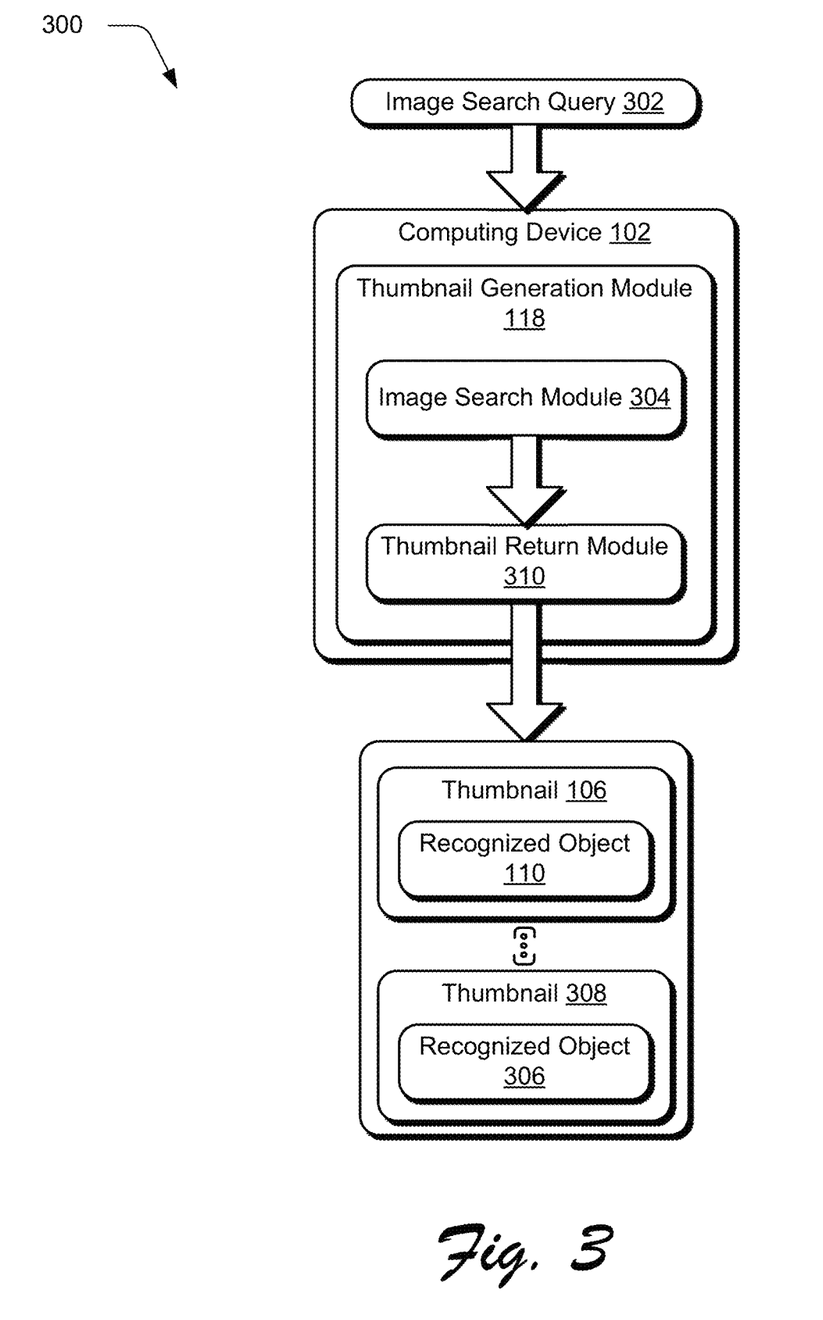
FIG. 3 is an illustration of an example digital medium implementation illustrating operation of the thumbnail generation module of FIG. 1 in greater detail.

FIG. 3 depicts an example implementation, generally at 300, showing operation of the thumbnail generation module 118 of FIG. 1 in greater detail as returning thumbnails of at least one panoramic image responsive to receiving an image search query 302. In order to do so, the computing device 102 receives the image search query 302. The image search query 302 may comprise search terms, nouns, objects, object attributes, and so on. For example, the image search query 302 may comprise a search term "white boat." The image search query 302 may be received locally from computing device 102 or from another computing device connected to computing device 102 through network 114, e.g., the Internet, a Wi-Fi network (e.g., in accordance with one or more IEEE 802.11 standards), a wireless network, cellular data network, and so forth.

The image search query 302 is received by an image search module 304 that is implemented at least partially in hardware to receive the image search query 302 and determine at least one recognized object that matches the image search query 302, shown as recognized objects 110 and 306. Image search module 304 searches for recognized objects within panoramic images (recognized by the object location module 116) that match the image search query 302. Recognized objects 110 and 306 may be from the same panoramic image, e.g. if a panoramic image contains two white boats, or from two different panoramic images, e.g. two panoramic images that each contain a white boat. Although two recognized objects and associated thumbnails are shown, the image search module 304 may find any number of recognized objects from any number of panoramic images. Thus, the image search module 304 determines locations for recognized objects 110 and 306 within the respective panoramic images that match the search query 302.

The locations of recognized objects 110 and 306 are then received by a thumbnail return module 310 that is implemented at least partially in hardware to output thumbnails 106 associated with recognized object 110 and thumbnail 308 associated with recognized object 306. As discussed above, the thumbnails may be generated prior to the search, e.g. at a time the object location module 116 recognizes objects, or the thumbnails may be generated responsive to the search based on coordinates of the recognized objects and the respective panoramic images that contain the recognized objects. Thus, thumbnail return module 310 sends thumbnails 106 and 308 that are specific to detected objects 110 and 306, respectfully, both of which match image search query 302.

Figure 4:
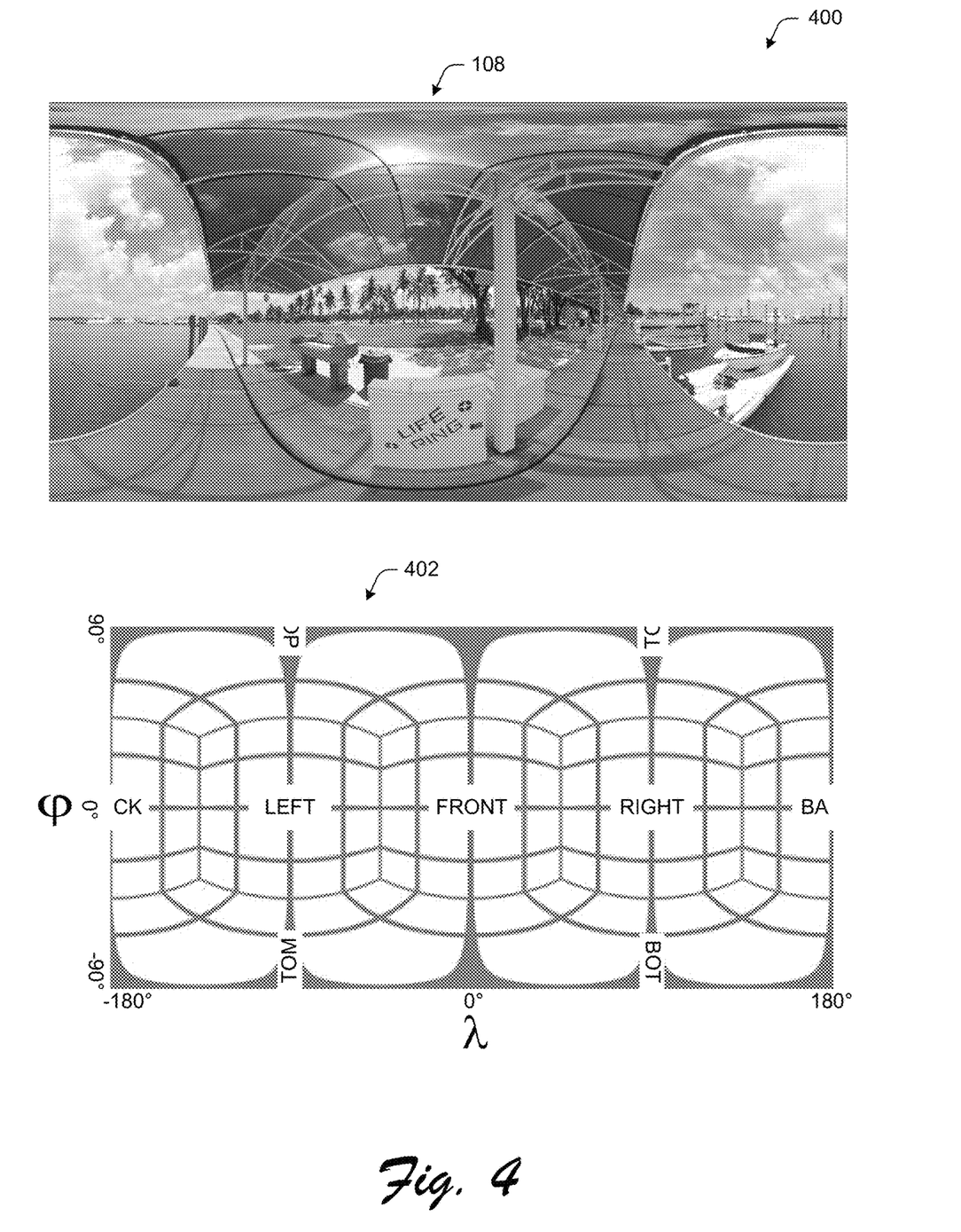
FIG. 4 is an illustration of an example implementation illustrating an example 2D projection of a panoramic image.

FIG. 4 depicts an example implementation, generally at 400, showing the panoramic image 108 as an 2D equirectangular projection and an example coordinate system 402 for the 2D equirectangular projection. In this example, coordinate system uses standard latitude (phi) and longitude (lambda) coordinates that are similar to coordinates used for globes and maps of Earth. Any coordinate system may be used without departing from the scope of this disclosure. Coordinate system 402 also contains a visual guide displaying what parts of the panoramic image 108 are where in relation to the viewer. As shown, the grass is in front of the viewer, the concrete sidewalk/dock runs out to the left and right of the viewer, and the ocean is behind the viewer.

Figure 5:
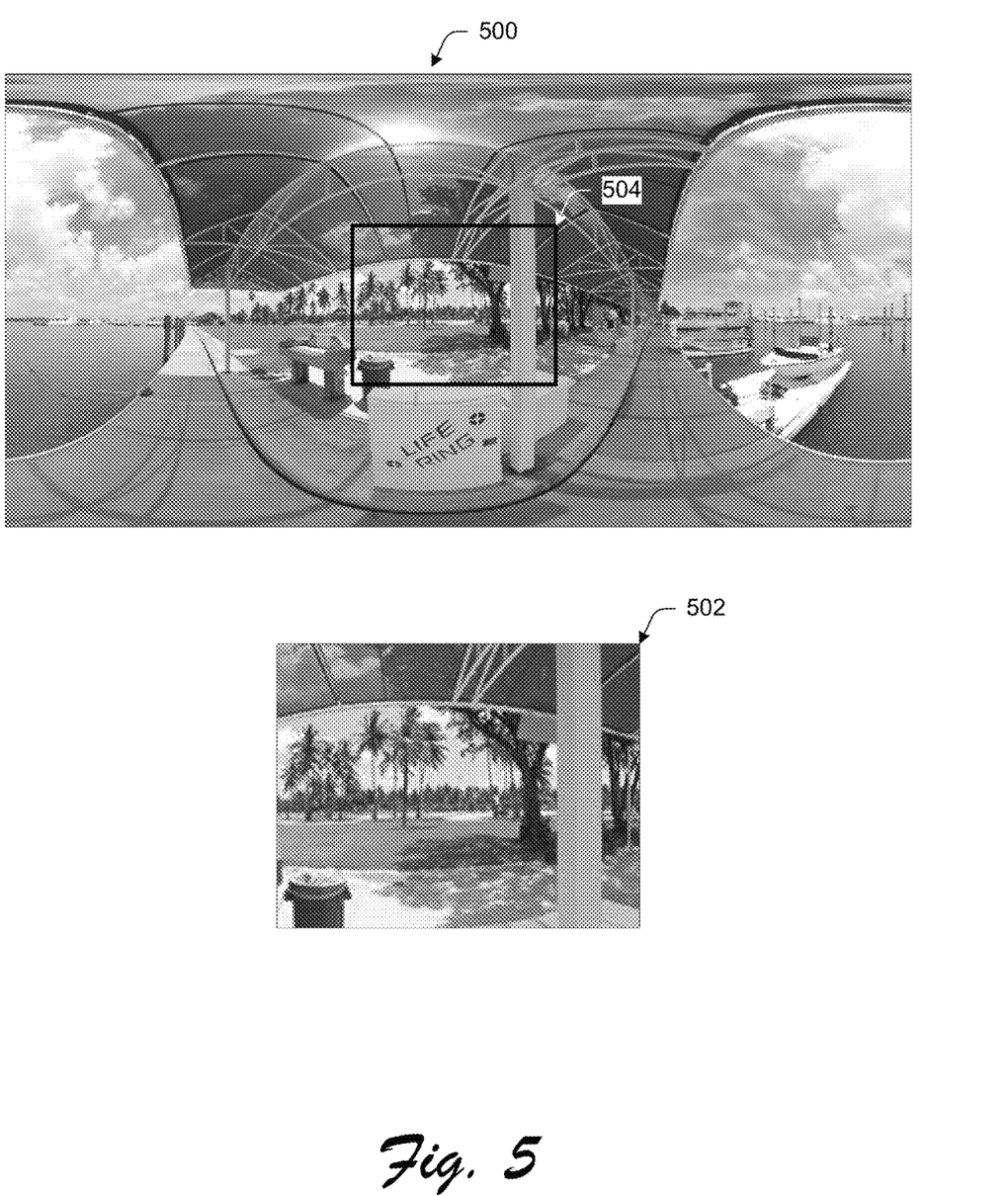
FIG. 5 is an illustration of an example implementation illustrating conventional techniques of generating a thumbnail from the panoramic image of FIG. 4.

FIG. 5 depicts examples of conventional techniques of generating a thumbnail for the panoramic image of FIG. 4 to output responsive to receiving an image search. In this example, a first thumbnail 500 may be generated comprising the entirety of the 2D projection. As shown, a user may not be able to discern details about objects within the thumbnail due to distortion and the large field of view within the thumbnail. A second thumbnail 502 may be generated comprising a portion in the middle of the 2D projection (denoted by bounding box 504). As shown, a user is only exposed to a small portion of the image data and thus may determine that the panoramic image is irrelevant to the image search.

Figure 6:
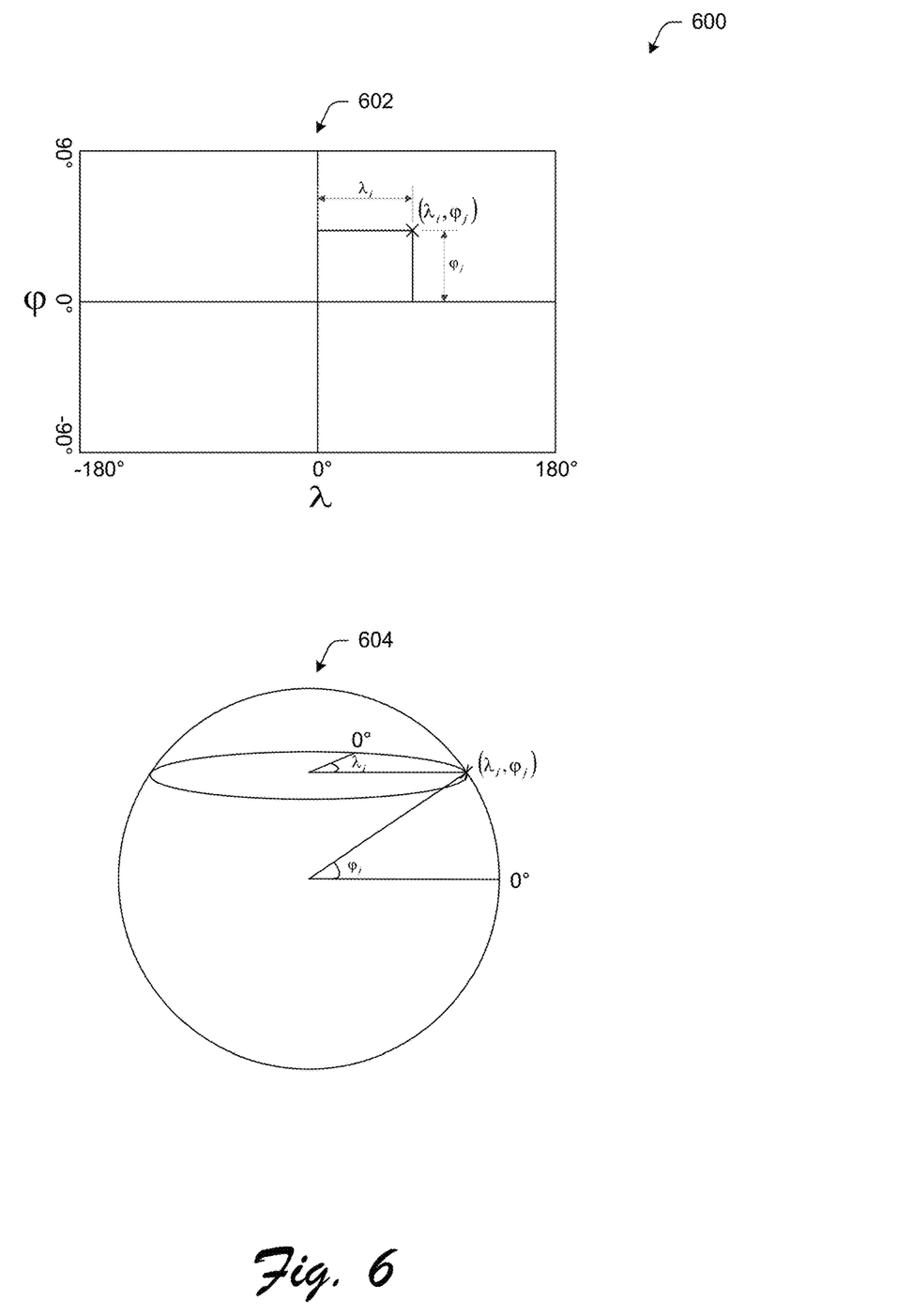
FIG. 6 is an illustration of an example implementation illustrating a relationship between a 2D projection and a 3D projection of a panoramic image.

FIG. 6 depicts an example implementation, generally at 600, showing how coordinates of an equirectangular 2D projection 602 of a panoramic image are "reverse projected" to a 3D spherical projection 604 by reverse projection module 202. The term reverse is used because, as discussed above, the native format of a panoramic image is a 3D projection. In this example, the same coordinate system from FIG. 4 is used (item 402). A point within the equirectangular 2D projection 602 has coordinates $(\lambda_i, \varphi_j)$ corresponding to its longitude and latitude, respectively, when reverse projected onto a 3D sphere. This is why equirectangular projections are sometimes referred to as "non-projections" because of the direct coordinate mapping between 2D and 3D. In order to reverse project the 2D projection 602 to the 3D projection 604, the longitudes and latitudes from the points are used as angles in two dimensions to place pixels in respective places on the sphere. This is very similar to mapping points from a map to a globe. Although an equirectangular projection is used, any type of 2D projection may be reverse projected to 3D similarly, as each type of 2D projection has a method of reverse projection to 3D.

Figure 7:
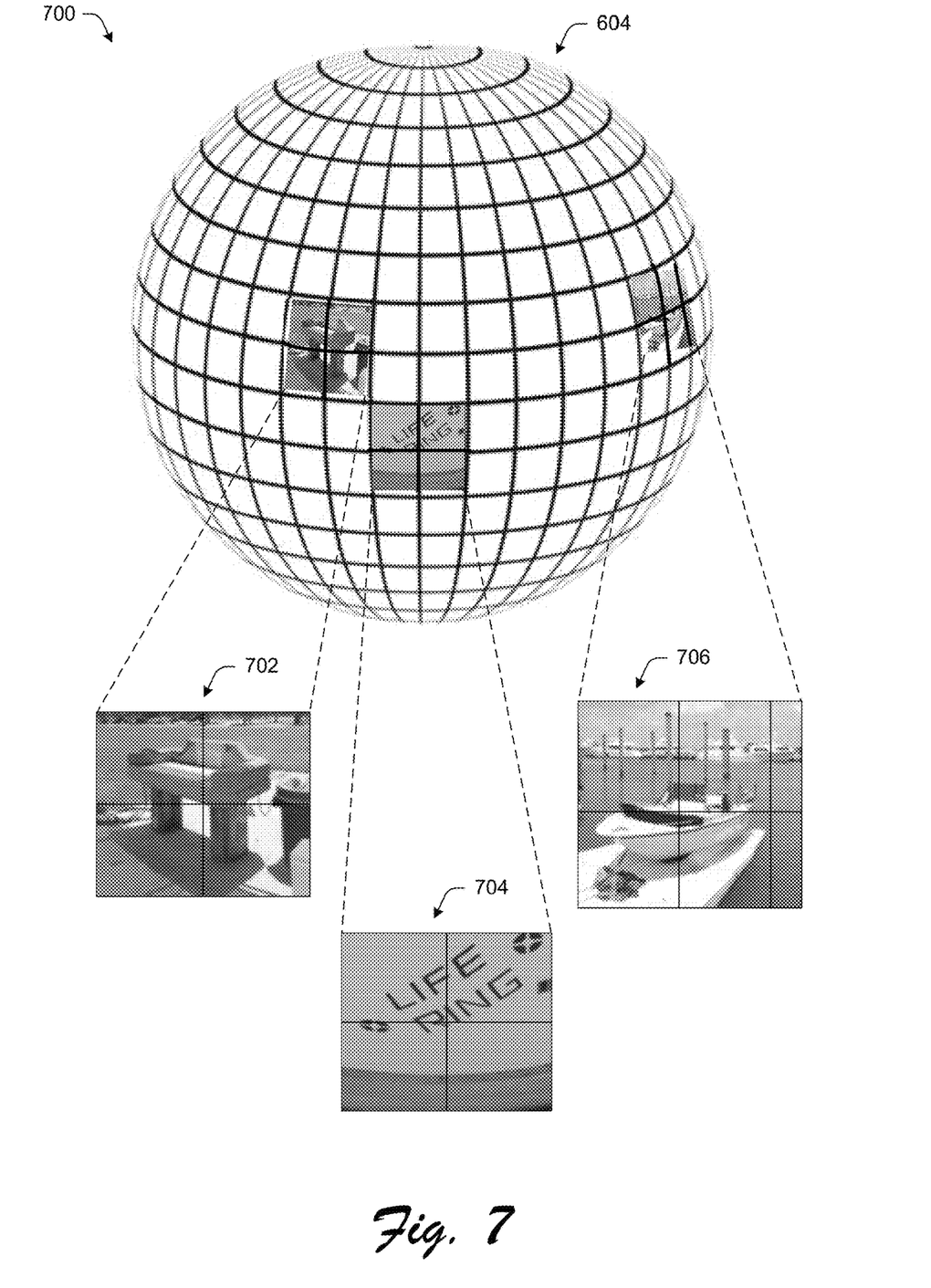
FIG. 7 is an illustration of an example implementation illustrating multiple 2D projections of portions of a 3D projection of the panoramic image of FIG. 4.

FIG. 7 depicts an example implementation, generally at 700, showing how portions of the 3D spherical projection 604 from FIG. 6 are forward projected back to 2D by the sliding window forward projection module 204 and how object recognition is performed on the 2D projections of the portions by the object recognition module 206. In order to do so, a series of portions of the 3D projection are generated by the sliding window forward projection module 204 (denoted by lines on the sphere). The portions may be any size, and the process may repeat for a plurality of portion sizes. Once portions are determined, each portion is forward projected by the sliding window forward projection module 204 to 2D. A sliding window may be used which progressively projects adjacent portions around the sphere. By forward projecting only a portion of the panoramic image, distortions are not generated, and thus object recognition can be used more effectively.

Once the 2D projections of the portions are generated, object recognition is performed on each of the portions by the object recognition module 206. Object recognition may be any sort of detection of objects contained within the image and attributes of the objects. Attributes may be words within the image (detected through text recognition), shapes, colors, and so on. As discussed above, multiple sizes of portions may be used to ensure that recognized objects are contained within a portion, or a recognized object may span multiple portions. Regardless, locations of the objects are determined, for example as latitude and longitude coordinates of the objects, a bounding box surrounding the object having latitude and longitude coordinates, another coordinate system, and so on, such that the objects can be located within the 3D projection. In this example, object recognition has determined that there is a bench 702, a life ring box 704, and a white boat 706 within panoramic image 108 with corresponding locations that will be discussed below in reference to FIG. 8.

Figure 8:
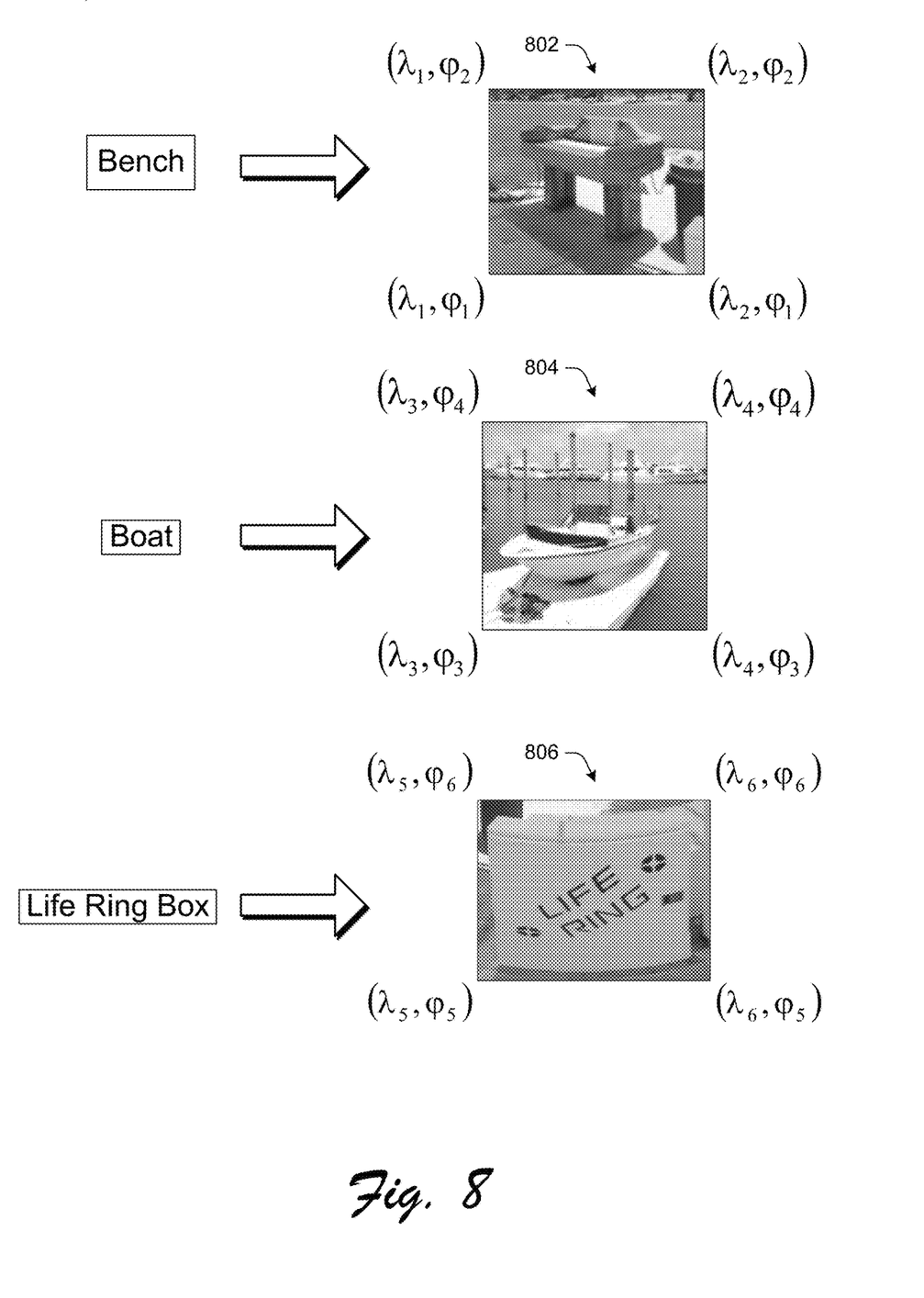
FIG. 8 is an illustration of an example implantation illustrating locations of recognized objects that match search terms of an image search and thumbnails generated for each of the search terms with regards to the panoramic image of FIG. 4.

FIG. 8 depicts an example implementation, generally at 800, showing functionality of the thumbnail generation module 118 as generating and returning thumbnails specific to three separate image search queries 302 that match portions of panoramic image 108. First, a search query for a bench is received by the thumbnail generation module 118. The thumbnail generation module 118 determines that panoramic image 108 contains a bench with locations $(\lambda_1, \varphi_1)$, $(\lambda_2, \varphi_1)$, $(\lambda_1, \varphi_2)$, $(\lambda_2, \varphi_2)$. Responsive to the determination, the thumbnail generation module 118 generates thumbnail 802 comprising a 2D projection of a portion of the panoramic image corresponding to the coordinates of the bench. Two other search queries are depicted representing search queries for a boat and a life ring box, for which the thumbnail generation module 118 generates thumbnails 804 and 806 from panoramic image 108, respectively. All three of the thumbnails 802, 804, and 806 are linked to panoramic image 108. Thus, a computing device that receives thumbnails 802, 804, and 806 responsive to a search query navigates to the entire panoramic image 108 responsive to receiving a user selection to any of the thumbnails 802, 804, and 806. In another implementation, selection of a thumbnail causes the computing device to navigate to an image of the identified portion of the panoramic image corresponding to the thumbnail and not the entire panoramic image 108. In this way, different thumbnails of panoramic image 108 may be generated by the computing device depending on terms/attributes of a search query matching portions of the panoramic image 108.

Through use of the techniques described herein, a thumbnail can be generated from a panoramic image depicting a portion of the panoramic image that meets a search criterion. For example, if a user searches for a boat, and a panoramic image contains a boat, then the system returns a thumbnail of only the boat and not the entire image or a default thumbnail of the image. In this way, different thumbnails for a single panoramic image may be generated depending on search terms used to find the panoramic image. This leads to image search results that are both accurate and easy to parse by a user.

Example Procedures

The following discussion describes generating thumbnails from panoramic images that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8.

Figure 9:
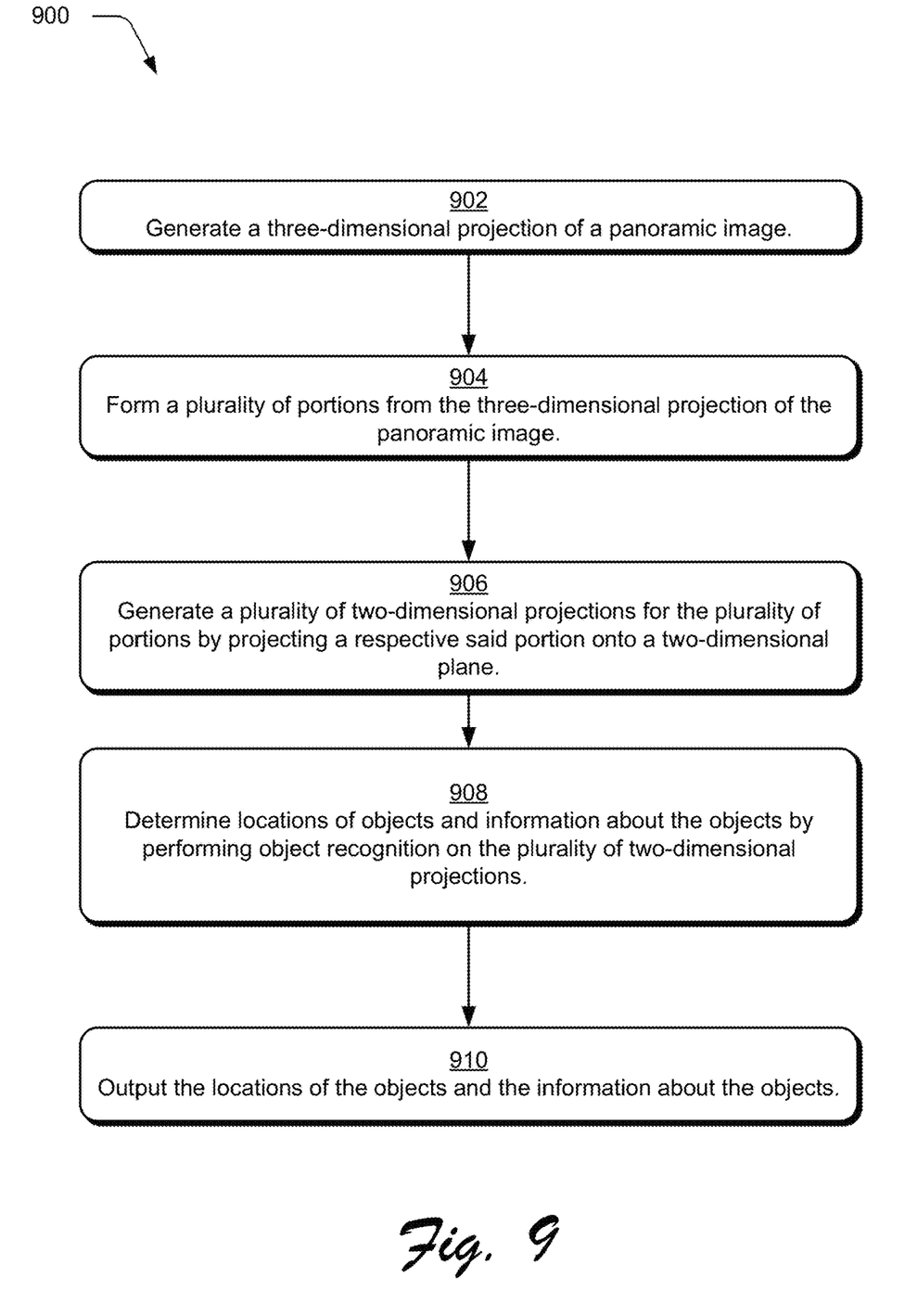
FIG. 9 is a flow diagram depicting a procedure in an example implementation to detect an object and determine a location of the recognized object within a panoramic image for use in generating a thumbnail from the panoramic image.

FIG. 9 depicts, generally at 900, a procedure in an example implementation in which a location of a recognized object within a panoramic image is determined by a computing device.

First, a 3D projection of a panoramic image is generated by the computing device (step 902). The panoramic image may be received as a 2D projection, such as an equirectangular projection. An example of a received 2D projection is panoramic image 108 discussed with respect to FIGS. 1, 2, 4 and 6. Regardless of how the panoramic image is received, the panoramic image 2D is reverse projected to a 3D surface to generate a 3D projection of the panoramic image. For example, the equirectangular projection 108 may be projected onto a sphere to generate the spherical 3D projection 604 of the panoramic image discussed with respect to FIG. 6. In an implementation, the panoramic image is received as a 3D projection, which removes the need for step 902.

Second, a plurality of portions of the 3D projection are formed by the computing device (step 904). In the case of a spherical 3D projection, portions may comprise square windows dispersed over the surface of the sphere. An example of portions of a 3D projection are the squares or "sliding window" on the spherical projection 604 discussed with respect to FIG. 7.

Third, a plurality of two-dimensional projections for the plurality of portions are generated by the computing device by projecting a respective said portion onto a two-dimensional plane (step 906). For example, a sliding window may be used that projects the portions in a sequence of adjacent portions to a two dimensional plane.

Fourth, locations of objects and information about the objects is determined by the computing device by performing object recognition on the plurality of two-dimensional projections (step 908). Objects may be recognized even if the objects span multiple portions. In an implementation, a size of the portions is varied, and the partitioning, projection, and object recognition are repeated such that objects of various sizes can be identified within the portions. Examples of identified objects and portions are the bench 702, the life ring box 704, and the white boat 706 within panoramic image 108 discussed with respect to FIG. 7.

Finally, locations of the objects and the information about the objects is output by the computing device (step 910). For example, a location of a white boat by be output once the white boat is identified in the panoramic image. Examples of identified locations of objects are the coordinates of thumbnails 802, 804, and 806 discussed with respect to FIG. 8.

Although described in terms of the above steps, in an implementation, object recognition may be performed on the 2D projection of the entire panoramic image to determine locations of objects. In this way, similar locations can be determined without necessitating reverse projection of the panoramic image and forward projection of each of the portions.

Figure 10:
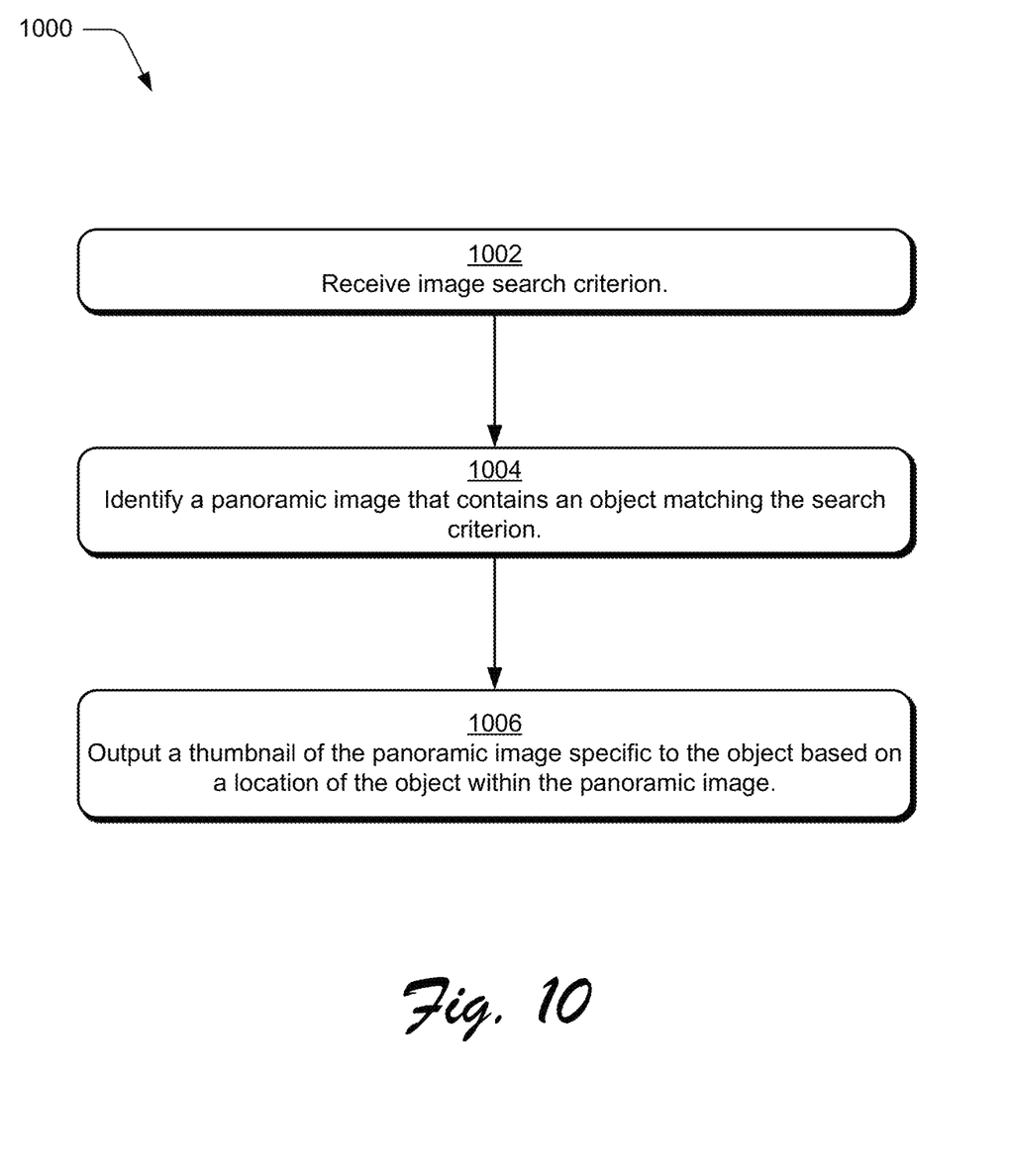
FIG. 10 is a flow diagram depicting a procedure in an example implementation to output a generated thumbnail from a panoramic image corresponding to an object within the panoramic image.

FIG. 10 depicts, generally at 1000, a procedure in an example implementation in which a thumbnail of a portion of a panoramic image is output by a computing device responsive to the portion containing an object that meets a search criterion.

First, an image search criterion is received by the computing device (step 1002). The search criterion may describe an object, such as a white boat, that a user is searching for. Examples of search terms are "bench," "boat," and "life ring box" discussed with respect to FIG. 8.

Second, a panoramic image is identified by the computing device that contains an object that matches the search criterion (step 1004). As discussed above with respect to FIG. 8, panoramic image 108 may be identified as containing objects associated with "bench," "boat," and "life ring box." The objects may be identified using any of the techniques and systems described above.

Third, a thumbnail of the panoramic image specific to the object based on a location of the object within the panoramic image is generated and output by the computing device (step 1006). The thumbnail may be generated by projecting a portion of a 3D projection of the panoramic image corresponding to the portion to a 2D plane. Continuing the example from above, thumbnails 802, 804, and 806 may be generated responsive to receiving search queries for "bench," "boat," and "life ring box," respectively. In this way, a user who searches for an object that is determined to be within a panoramic image only receives a thumbnail of a portion of the panoramic image that contains the object.

Example System and Device

Figure 11:
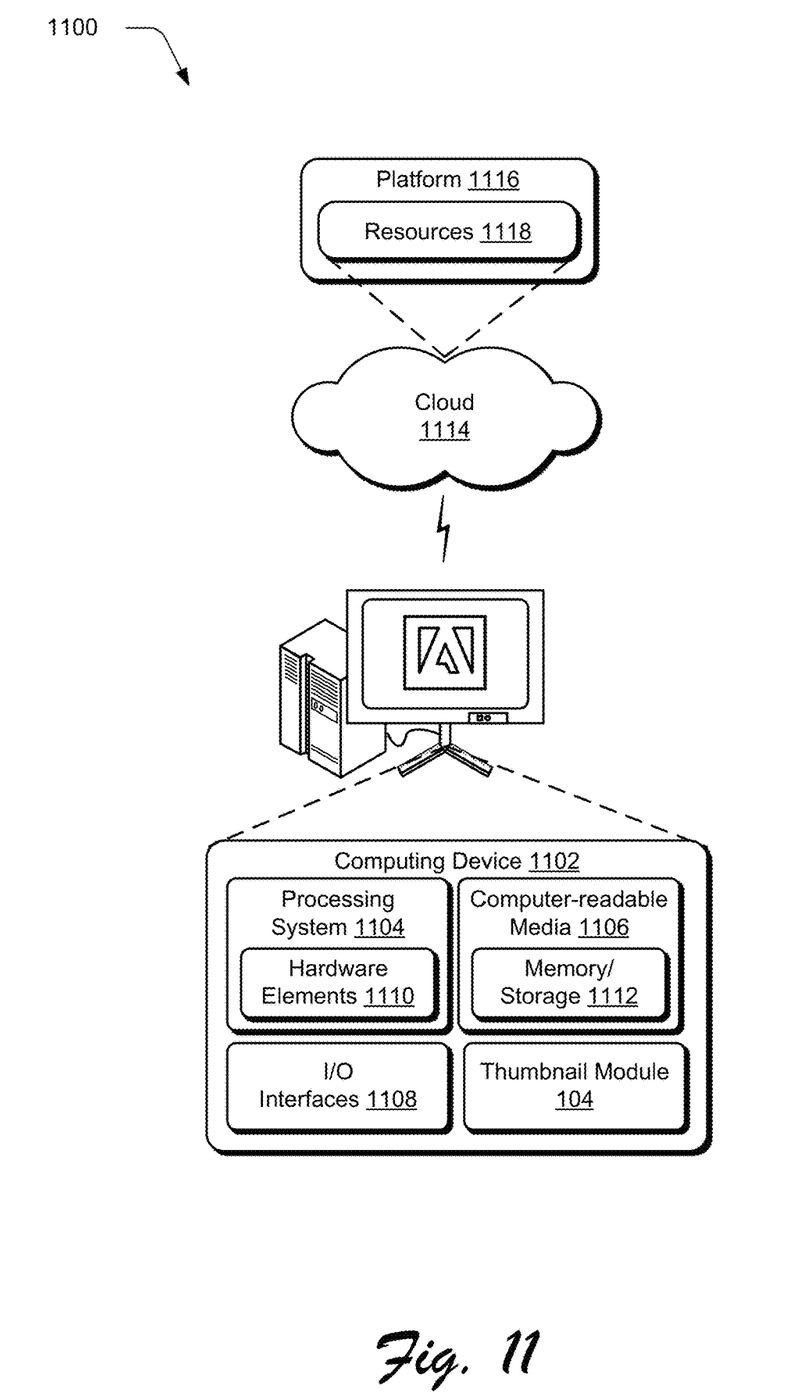
FIG. 11 is an illustration of a system and device in an example implementation that is operable to generate thumbnails from panoramic images.

FIG. 11 depicts, generally at 1100, an example implementation showing an example computing device 1102 that is representative of one or more computing systems and/or devices that may implement the various techniques described herein. This is illustrated through inclusion of the thumbnail module 104, which may be configured to generate thumbnails from panoramic images. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which the elements are formed or the processing mechanisms employed therein. For example, processors may be configured as of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device implementation, implementation of functionality described herein may be distributed throughout the system 1100. For example, the functionality may be implemented in part on the computing device 1102 as well as via the platform 1116 that abstracts the functionality of the cloud 1114.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. In a digital medium object location environment, a method implemented by at least one computing device, the method comprising:
  receiving, by the at least one computing device, a single panoramic image;

forming, by the at least one computing device, a plurality of portions from the single panoramic image;

determining, by the at least one computing device, which of the plurality of portions include an object using object recognition;

determining, by the at least one computing device, a location of the object with respect to the single panoramic image based on which of the plurality of portions include the object; and outputting, by the at least one computing device, an indication of the location of the object with respect to the single panoramic image.

2. The method of claim 1, further comprising generating a plurality of two-dimensional projections, respectively, from the plurality of portions and the determining of which of the plurality of portions include the object is based on the plurality of two-dimensional projections.

3. The method of claim 2, wherein the generating includes generating the plurality of two-dimensional projections by projecting a respective said portion onto a two-dimensional plane.

4. The method of claim 3, wherein the generating includes sliding a window over a three-dimensional projection of the single panoramic image.

5. The method of claim 3, wherein the projecting is performed for a plurality of different portion sizes.

6. The method of claim 3, wherein the two-dimensional projections of the portions of the singe panoramic image comprise equirectangular projections.

7. The method of claim 3, wherein the object recognition is performed on each of the two-dimensional projections of the portions of the singe panoramic image as the two-dimensional projections are generated.

8. The method of claim 1, wherein the determining further comprises determining information about the object, the information including what the object comprises, a color of the object, attributes of the object, a shape of the object, identified words, or search terms associated with the object.

9. The method of claim 1, wherein the single panoramic image comprises a 360-degree view.

10. The method of claim 1, wherein the indication of the location of the object defines a bounding area within thea three-dimensional projection.

11. In a digital medium search environment, a method implemented by at least one computing device, the method comprising:

receiving, by the at least one computing device, an image search criterion;

identifying, by the at least one computing device, a single panoramic image as corresponding to the image search criterion;

obtaining, by the at least one computing device, a portion of the single panoramic image that includes an object specified by the image search criterion, the portion determined from a plurality of portions formed from the single panoramic image and identified as including the object using object recognition; and outputting, by the at least one computing device, the obtained portion as part of an image search result responsive to the image search criterion.

12. The method of claim 11, wherein the plurality of portions are two-dimensional projections.

13. The method of claim 12, wherein the two-dimensional projections comprise equirectangular projections.

14. The method of claim 12, wherein the two-dimensional projections are formed by sliding a window over a three-dimensional projection of the single panoramic image.

15. The method of claim 12, wherein the two-dimensional projections are formed by projecting a three-dimensional projection of the single panoramic image onto a two-dimensional plane.

16. The method of claim 12, wherein the two-dimensional projections including a plurality of different portion sizes.

17. In a digital medium environment to locate an object within a single panoramic image, a system comprising:

means for forming a plurality of portions from the single panoramic image;

means for determining which of the plurality of portions include the object using object recognition;

means for determining a location of the object with respect to the single panoramic image based on which of the plurality of portions include the object; and means for outputting an indication of the location of the object with respect to the single panoramic image.

18. The system of claim 17, wherein the single panoramic image comprises a 360-degree view.

19. The system of claim 17, wherein the indication of the location of the object defines a bounding area within a three-dimensional projection.

20. The system of claim 17, further comprising means for generating a plurality of two-dimensional projections, respectively, from the plurality of portions and the determining means of which of the plurality of portions include the object is based on the plurality of two-dimensional projections.

* * * * *